US008904526B2

(12) United States Patent
Deb et al.

(10) Patent No.: US 8,904,526 B2
(45) Date of Patent: Dec. 2, 2014

(54) ENHANCED NETWORK SECURITY

(71) Applicant: Bank of America Corporation, Charlotte, NC (US)

(72) Inventors: Subhajit Deb, New Delhi (IN); Anil Chopra, New Delhi (IN); Kedarnath Shukla, Navi Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 5 days.

(21) Appl. No.: 13/681,557

(22) Filed: Nov. 20, 2012

(65) Prior Publication Data

US 2014/0143863 A1    May 22, 2014

(51) Int. Cl.
G06F 12/14      (2006.01)
H04L 9/32       (2006.01)
G06F 21/50      (2013.01)

(52) U.S. Cl.
CPC ..................................... *G06F 21/50* (2013.01)
USPC ............................................. 726/22; 713/166

(58) Field of Classification Search
CPC ....................................................... G06F 21/50
USPC ................ 726/21–25, 26; 713/166, 167, 193; 715/234, 215
See application file for complete search history.

(56) References Cited

U.S. PATENT DOCUMENTS

| 6,654,751 B1 * | 11/2003 | Schmugar et al. ..................... 1/1 |
| 7,313,825 B2 * | 12/2007 | Redlich et al. ................... 726/27 |
| 7,322,047 B2 * | 1/2008 | Redlich et al. ................... 726/27 |
| 7,395,244 B1 * | 7/2008 | Kingsford ........................ 705/52 |
| 8,196,207 B2 * | 6/2012 | Hill et al. ........................ 726/25 |
| 8,230,504 B1 * | 7/2012 | Jafari et al. ...................... 726/22 |
| 8,256,004 B1 * | 8/2012 | Hill et al. ........................ 726/25 |
| 2006/0136721 A1 * | 6/2006 | Bruestle et al. ................ 713/168 |
| 2007/0006300 A1 * | 1/2007 | Zamir et al. .................... 726/22 |
| 2007/0083929 A1 * | 4/2007 | Sprosts et al. .................. 726/22 |
| 2007/0142030 A1 * | 6/2007 | Sinha et al. ................... 455/410 |
| 2007/0157311 A1 * | 7/2007 | Meier et al. ..................... 726/22 |
| 2007/0226796 A1 * | 9/2007 | Gilbert et al. ................... 726/22 |
| 2008/0115221 A1 * | 5/2008 | Yun et al. ........................ 726/25 |
| 2008/0148404 A1 * | 6/2008 | Denton ........................... 726/23 |
| 2008/0168135 A1 * | 7/2008 | Redlich et al. ................ 709/204 |
| 2008/0222734 A1 * | 9/2008 | Redlich et al. ................. 726/26 |
| 2008/0307525 A1 * | 12/2008 | Nickle ............................ 726/22 |
| 2008/0320305 A1 * | 12/2008 | Bruestle et al. ................ 713/168 |
| 2010/0010968 A1 * | 1/2010 | Redlich et al. ..................... 707/3 |
| 2010/0042472 A1 * | 2/2010 | Scates ............................ 705/10 |
| 2010/0042918 A1 * | 2/2010 | Scates ........................... 715/273 |
| 2010/0043074 A1 * | 2/2010 | Scates ............................ 726/25 |
| 2010/0082513 A1 * | 4/2010 | Liu .................................. 706/46 |
| 2010/0192225 A1 * | 7/2010 | Ma et al. ......................... 726/23 |
| 2010/0319069 A1 * | 12/2010 | Granstedt et al. ............... 726/22 |
| 2010/0325731 A1 * | 12/2010 | Evrard ............................ 726/25 |
| 2012/0096552 A1 * | 4/2012 | Paek et al. ...................... 726/23 |
| 2012/0096558 A1 * | 4/2012 | Evrard ............................ 726/25 |
| 2012/0167210 A1 * | 6/2012 | Oro Garcia et al. ............ 726/22 |
| 2012/0215575 A1 * | 8/2012 | Deb et al. ..................... 705/7.12 |

(Continued)

*Primary Examiner* — Abu Sholeman
(74) *Attorney, Agent, or Firm* — Michael A. Springs

(57) ABSTRACT

A system may receive a plurality of security threats and categorize each security threat in the plurality of security threats into security threat categories. The system may then determine, based at least in part upon an instance of a security threat category, a future occurrence of the security threat category and determine, based at least in part upon the future occurrence of the security threat category, that the security threat category is an emerging threat.

6 Claims, 4 Drawing Sheets

(56) References Cited

U.S. PATENT DOCUMENTS

| | | |
|---|---|---|
| 2012/0240231 A1* | 9/2012 | Sohn et al. .................. 726/24 |
| 2012/0246730 A1* | 9/2012 | Raad .............................. 726/25 |
| 2013/0031625 A1* | 1/2013 | Lim ................................ 726/22 |
| 2013/0304761 A1* | 11/2013 | Redlich et al. ................ 707/781 |
| 2014/0040618 A1* | 2/2014 | LIU et al. ...................... 713/168 |
| 2014/0095682 A1* | 4/2014 | Yablokov ....................... 709/223 |

* cited by examiner

ENHANCED NETWORK SECURITY

TECHNICAL FIELD

This disclosure relates generally to enhancing network security.

BACKGROUND

As the world becomes increasingly digital and interconnected, the security risks posed to networks becomes more diverse and difficult to manage. When these security risks are not managed properly, networks become exposed to security threats that may be severe.

SUMMARY OF THE DISCLOSURE

According to one embodiment, a system may receive a plurality of security threats and categorize each security threat in the plurality of security threats into security threat categories. The system may then determine, based at least in part upon an instance of a security threat category, a future occurrence of the security threat category and determine, based at least in part upon the future occurrence of the security threat category, that the security threat category is an emerging threat.

Certain embodiments may provide one or more technical advantages. A technical advantage of one embodiment includes enhancing network security by forecasting future occurrences of particular security threats. Another technical advantage of an embodiment includes enhancing network security by protecting against categories of security threats. Yet another technical advantage of an embodiment includes enhancing network security by prioritizing categories of security threats that should be protected against. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 4 of the drawings, like numerals being used for like and corresponding parts of the various drawings.

This disclosure describes a system for enhancing network security. As the world becomes increasingly digital and interconnected, the security risks posed to networks becomes more diverse and difficult to manage. Data breaches, identity theft, malware, and hackers are only a few of the problems reported frequently. Understanding network and environment context may help to prevent the most imminent and/or severe security risks. The proposed system may gather data relevant to various security threats, analyze the security threat data to determine a network and environment context, and forecast future occurrences of particular security threats. By properly understanding the network context and the forecasted future occurrences of security threats, a user may understand the effective lifespan of each security threat and properly prioritize the security threats most pertinent to the network.

As an example, the system may receive security threat data from a network firewall and a national security database. The system may analyze this data and determine that data modification attacks and denial of service attacks are emerging threats for the network. The system may further determine that spoof attacks are nearing the end of the lifecycle. The system may present this information to a user that manages the security risks for the network. The user may then use this information to implement appropriate protections against data modification attacks and denial of service attacks. The user may further lower or remove protections against spoof attacks because they are less likely to occur in the future according to the system's analysis.

In this manner, the user may identify and protect against emerging security threats before they impact the network. The user may also shift resources to protect against emerging threats rather than dedicating these resources to protect against threats that are at the end of their lifecycles.

Figure 1:
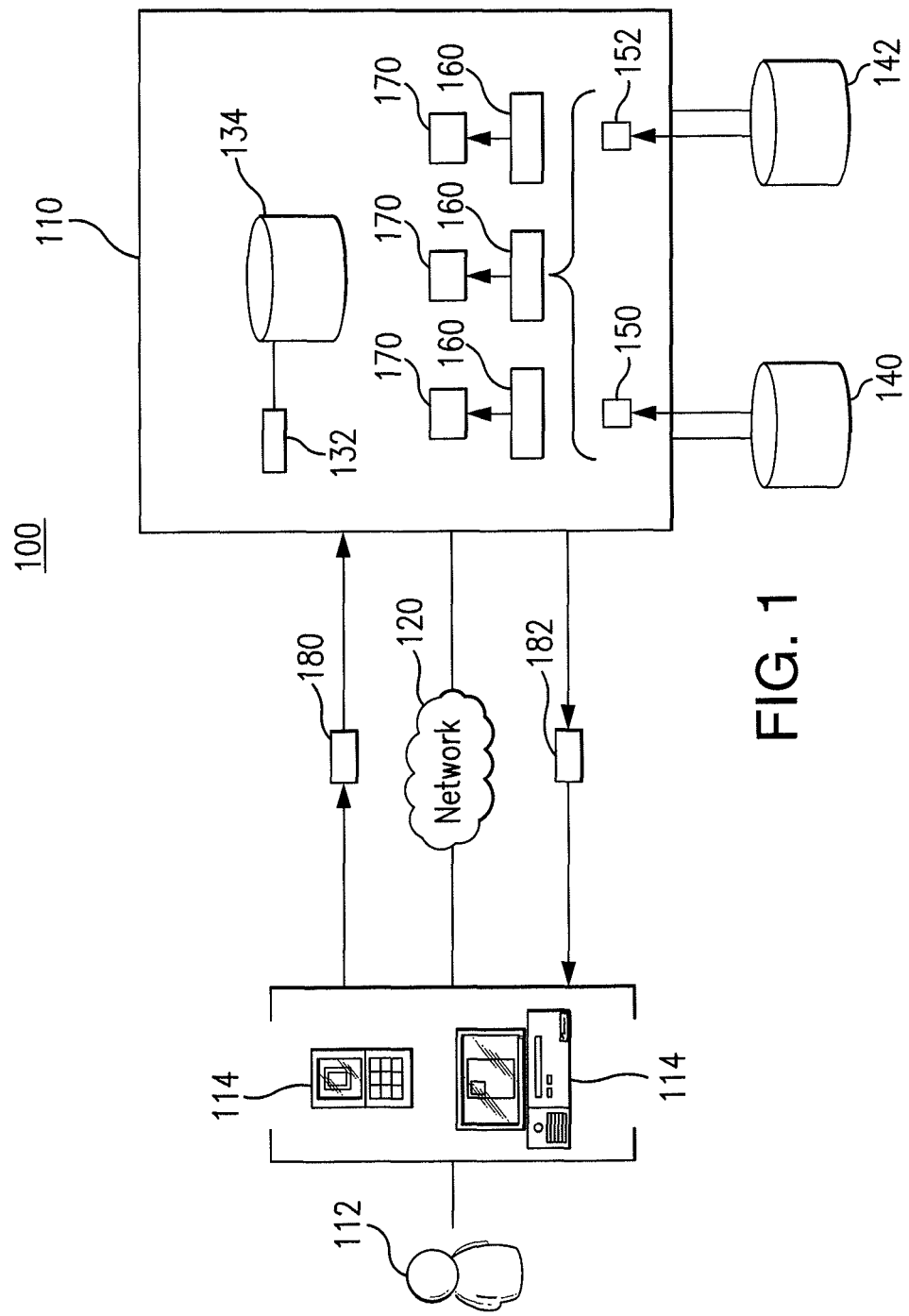
FIG. 1 illustrates a system for enhancing network security.

FIG. 1 illustrates a system 100 for enhancing network security. As provided by FIG. 1, system 100 includes a device 114, a network 120, and a server 110. Device 114 may be communicatively coupled to server 110 through network 120. A user 112 may use system 100 to categorize and analyze security threats. The user 112 may also use system 100 to forecast future occurrences of particular security threats. In this manner, system 100 may help user 112 to understand the effective lifecycles of security threats and to protect against the security threats that pose the most imminent or severe threat to network 120.

User 112 may use a device 114 to interact with system 100. For example, user 112 may use device 114 to request and receive security threat information from server 110. As another example, user 112 may use device 114 to view security threat information. Device 114 may use a processor and a memory to execute an application in order to perform any of the functions described herein.

Device 114 may be a mobile device such as a cell phone or tablet. Device 114 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. Device 114 may also include a user interface, such as a display, a touchscreen, a microphone, keypad, or other appropriate terminal equipment usable by user 112.

Network 120 facilitates communications between device 114 and server 110. This disclosure contemplates any suitable network 120 operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 120.

Server 110 may perform various functions in order to inform user 112 of the different security threats affecting network 120. Server 110 may include a processor 132 and a memory 134 that perform the functions described herein. For example, memory 134 may perform storage functions such as storing security threat data and processor 132 may analyze the security threat data and forecast future occurrences of security threats.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices.

Processor 132 may control the operation and administration of server 110 by processing information received from network 120 and memory 134. Processor 132 may include any hardware and/or software that operates to control and process information. Processor 132 may be a programmable logic device, a microcontroller, a microprocessor, any suitable processing device, or any suitable combination of the preceding.

Server 110 may receive threat data 150 from threat database 140. Threat database 140 may be communicatively coupled to server 110 through network 120. Threat data 150 may include information associated with the occurrences of various security threats. For example, threat data 150 may include the dates and number of occurrences of denial of service attacks, spoof attacks, data modification attacks, and/or any other suitable type of security threat. Threat data 150 may be collected by various sources such as firewalls, antivirus software, routers, network 120, and/or any suitable device on the network 120 that experiences attacks or is susceptible to security threats.

Server 110 may analyze threat data 150 to determine the history of a particular security threat. For example, server 110 may examine threat data 150 to determine that the number of denial of service attacks has been increasing. As another example, server 110 may use threat data 150 to determine that the number of spoof attacks has been on the decline. In this manner, server 110 may determine trends amongst various security threats. Server 110 may then use these trends to forecast future or expected behavior for these security threats.

In particular embodiments, server 110 may correlate threat data 150 associated with multiple security threats to determine relationships between and/or amongst the various security threats. For example, server 110 may examine threat data 150 associated with denial of service attacks and spoof attacks to determine that denial of service attacks increase when spoof attacks decrease. As another example, server 110 may examine threat data 150 to determine that data modification attacks accompany denial of service attacks. For security threats that are related and/or correlated, server 110 may later categorize them into a security threat category. Analysis on a security threat category may help a user 112 appropriately network 120 from one or more security threats.

Server 110 may receive intelligence data 152 from intelligence database 142. Intelligence database 142 may be communicatively coupled to server 110 through network 120. Intelligence data 152 may include intelligence and analysis of security threats. For example, intelligence data 152 may include a critical date associated with a security threat, such as a date when the security threat became an emerging threat, a date when the security threat began to decline and/or any other suitable date associated with the security threat. As another example, intelligence data 152 may indicate a trend associated with a security threat, such as a growth trend, a declining trend, and/or any other suitable trend associated with the security threat. As yet another example, intelligence data 152 may indicate security threats that should be closely monitored, such as security threats that are currently affecting several networks across a region or security threats that have been determined to be sponsored by a nation state.

Server 110 may categorize various security threats into security threat categories 160. Server 110 may categorize security threats based on the types of attacks associated with the security threats. For example, malformed network packet attacks and fragmentation attacks both involve manipulation of network packets to attack the network 120. Server 110 may categorize these two security threats as packet attack types. Server 110 may further categorize security threats based on the type of protection that would protect against the security threats. For example, a firewall would protect against viruses and worms. Hence, server 110 may categorize virus and worm attacks as firewall type threats. This disclosure contemplates server 110 categorizing security threats based on any suitable criteria. By analyzing and understanding security threat categories 160, a user 112 may understand the network context of network 120 and the types of security threats that affect the network 120.

Server 110 may analyze security threat categories 160. By analyzing security threat categories 160, server 110 may provide a clear picture of the security threats that affect the network 120. For example, server 110 may determine that the number of occurrences of security threats of a particular security threat category 160 is growing. Server 110 may further determine, based on intelligence data 152, that network 120 has been affected in the past by security threats of this particular security threat category 160. Based on these determinations, server 110 may alert user 112 to implement appropriate protections against security threats included in the security threat category 160. As another example, server 110 may determine that the number of occurrences of security threats associated with another security threat category 160 has been declining. Server 110 may further determine based on intelligence data 152 that network 120 currently implements protections against security threats associated with that security threat category 160. Based on these determinations, server 110 may alert user 112 to remove these protections.

Server 110 may further analyze security threat categories 160 to forecast future occurrences. Each forecast 170 may indicate predicted behavior of security threat categories 160. Server 110 may perform statistical analysis on the historical behavior of security threat categories 160 to generate forecast 170. Forecast 170 may include the dates of future occurrences of a security threat category 160 and the number of occurrences on those dates. Forecast 170 may further group those dates by month, year, and/or any other suitable period of time. A user 112 may use the historical behavior and the forecast 170 to determine what protections to implement on network 120 and when to implement them.

Server 110 may determine a forecast 170 for a security threat category 160 based on the historical behavior of that security threat category. For example, the historical behavior of a particular security threat category 160 may indicate that the number of occurrences of security threats of the security threat category 160 has been plateauing. Server 110 may analyze this information to forecast that the number of occurrences of the security threat category 160 will decline. As another example, the historical behavior of a security threat category 160 may indicate that the number of occurrences of the security threat category 160 has been steadily increasing. Based on this information, server 110 may forecast that the number of occurrences of the security threat category 160 will continue to increase. For example, server 110 may determine that denial of service type attacks are often followed by packet type attacks. Hence, when server 110 determines a forecast 170 for packet type attacks, server 110 may use the historical behavior of denial of service type of attacks in predicting the future occurrences of packet type attacks. For example, if server determines that several denial of service type attacks occurred recently, then server 110 may predict that packet type attacks may occur in the next few days.

Server 110 may further disregard particular data and/or information when statistically analyzing the historical behavior of a security threat category 160. For example, user 112 may specify that server 110 disregard spoof type attacks when analyzing denial of service type attacks. In response, server 110 may ignore the historical behavior of spoof type attacks when forecasting denial of service type attacks. As another example, there may have been a sudden spike in the number of denial of service type attacks in a particular month. However, that spike may have been a one-time attack perpetrated by an entity who has been caught. In that instance, server 110 may disregard that spike in forecasting the future occurrences of denial of service type attacks. This disclosure contemplates server 110 disregarding any number of instances of any suitable security threat category 160 in forecasting future occurrences.

Server 110 may assimilate the historical behavior and a forecast 170 associated with a security threat category 160 to produce a lifecycle for the security threat category 160. The lifecycle may indicate when the security threat category 160 emerged and when it is expected to decline. A user 112 may use the lifecycle to determine when appropriate protections should be implemented to protect against the security threat category 160. The user 112 may further determine when these protections may be removed. For example, user 112 may wish to implement the appropriate protections before the security threat category 160 emerges as a threat and user 112 may plan to remove these protections when the security threat category 160 is expected to decline.

Server 110 may further designate security threat categories 160 as emerging threats. In particular embodiments, server 110 may analyze forecast 170 to determine the number of predicted future occurrences for a particular security threat category 160. Server 110 may then compare this number with a threshold stored in server 110. If the number of predicted future occurrences is greater than the threshold, server 110 may designate the security threat category 160 as an emerging threat. Server 110 may then notify a user 112 of the emerging threat to indicate to user 112 that appropriate protections should be implemented. The threshold may be determined in any suitable manner. For example, user 112 may specify the threshold to be used. Server 110 may also determine the threshold based on historical behavior of the security threat category 160. For example, if a security threat category 160 historically occurred no more than ten times in a month, server 110 may determine the threshold to be fifteen. In other words, if the security threat category 160 is predicted to occur over fifteen times in a month, then server 110 may designate the security threat category 160 as an emerging threat. Server 110 may predict that the security threat category 160 will occur more than fifteen times in situations where intelligence data 152 indicates that the security threat category 160 has been occurring more on other networks 120 or that a nation state has been recently sponsoring attacks in that security threat category 160.

Server 110 may also rank security threat categories 160. For example, server 110 may rank security threat categories 160 based on severity or imminence. The higher a security threat category 160 is ranked, the more severe and more imminent it is. A user 112 may use these rankings to prioritize the protections to be implemented on network 120. For example, if server 110 ranks denial of service type attacks as the top security threat category 160, user 112 may wish to implement protections against denial of service type attacks before implementing protections against other security threat categories 160. This disclosure contemplates server 110 ranking security threat categories 160 in any suitable order based on any suitable criteria.

By generating forecast 170 and producing the lifecycles, server 110 may help enhance the security of network 120 by signaling when appropriate protections against particular security threat categories 160 should be implemented and/or removed. Furthermore, server 110 may help enhance network security by alerting user 112 of security threat categories 160 that may have not been previously considered.

In operation, system 100 may provide the historical and forecasted future behavior of security threat categories 160. User 112 may use a device 114 to request information associated with a security threat category 160. For example, user 112 may use device 114 to request information associated with a firewall preventable type attacks. User 112 may use this information to determine whether a firewall on network 120 should be reconfigured to protect against emerging threats and/or to ignore threats that are on the decline. Device 114 may communicate a request 180 to server 110 over network 120. The request 180 may indicate the security threat category 160 that user 112 has requested.

Server 110 may receive the request 180 and determine that user 112 has requested information associated with one or more security threat categories 160. In response, server 110 may analyze information associated with the security threat categories 160. Server 110 may examine the historical behavior of the security threat categories 160 and generate forecasts 170 associated with the security threat categories 160. Server 110 may then communicate the historical behavior and forecasts 170 to device 114 in a response 182. The response 182 may include the historical behavior and forecasts 170 associated with the requested security threat categories 160.

Server 110 may examine threat data 150 and intelligence data 152 to determine the security threats that should be categorized into the security threat categories 160 in request 180. In particular embodiments, server 110 may make this determination based on rules stored in server 110. For example, the rules may indicate the categories to which a particular security threat may belong.

Server 110 may then analyze the historical behavior of the security threat categories 160 in order to generate forecasts 170. Server 110 may examine threat data 150 and intelligence data 152 to determine the historical behavior of the security threat categories 160. For example, threat data 150 may include a record of the occurrences of particular security threats associated with the security threat categories 160 and intelligence data 152 may indicate growth trends and critical dates associated with particular security threats of the security threat categories 160. Server 110 may perform statistical analysis on this information to generate forecasts 170. The forecast 170 may indicate the predicted future behavior of the security threat categories 160. For example, forecast 170 may include the dates of future occurrences of the security threat categories 160 and the number of expected future occurrences. By analyzing the historical behavior to generate a forecast 170, server 110 may provide a complete picture of the lifecycle of the requested security threat categories 160.

Server 110 may further include recommendations in response 182. The recommendations may indicate the appropriate protections to implement and/or remove from network 120 based on the historical behavior and forecasts 170 of the security threat categories 160. Server 110 may determine the recommendations by examining the historical behavior, forecasts 170, and intelligence data 152. For example, the historical behavior and forecast 170 may indicate the trends associated with a particular security threat category 160. Intelligence data 152 may indicate the protections that have been implemented on network 120. Server 110 may examine this information to determine that the particular security threat category 160 is becoming an emerging threat and that the appropriate protections have not been implemented on network 120. In response, server 110 may recommend, in response 182, the appropriate protections to be implemented on network 120 in order to protect against the security threat category 160.

Server 110 may further include alerts in response 182. For example, server 110 may include an alert in response 182 indicating that denial of service type attacks have been designated an emerging threat. As another example, server 110 may include an alert in response 182 indicating that spoof type attacks are dying down and that protections may be removed. Users 112 may see these alerts and respond accordingly.

Device 114 may receive the response 182 and present, on a display, the requested information. For example, device 114 may present, on the display, a chart illustrating the historical and forecasted behavior of the requested security threat categories 160. As another example, device 114 may present, on the display, the recommendations determined by server 110 in order to appropriately protect against the requested security threat categories 160. Device 114 may further present, on the display, alerts that server 110 included in response 182.

In this manner, user 112 may use system 100 to determine the security threat categories 160 that are emerging and that should be protected against. User 112 may then implement the appropriate protections to protect against these security threat categories 160. Furthermore, user 112 may use system 100 to determine the security threat categories 160 that are on the decline so that user 112 may remove protections against these security threat categories 160.

Figure 2:
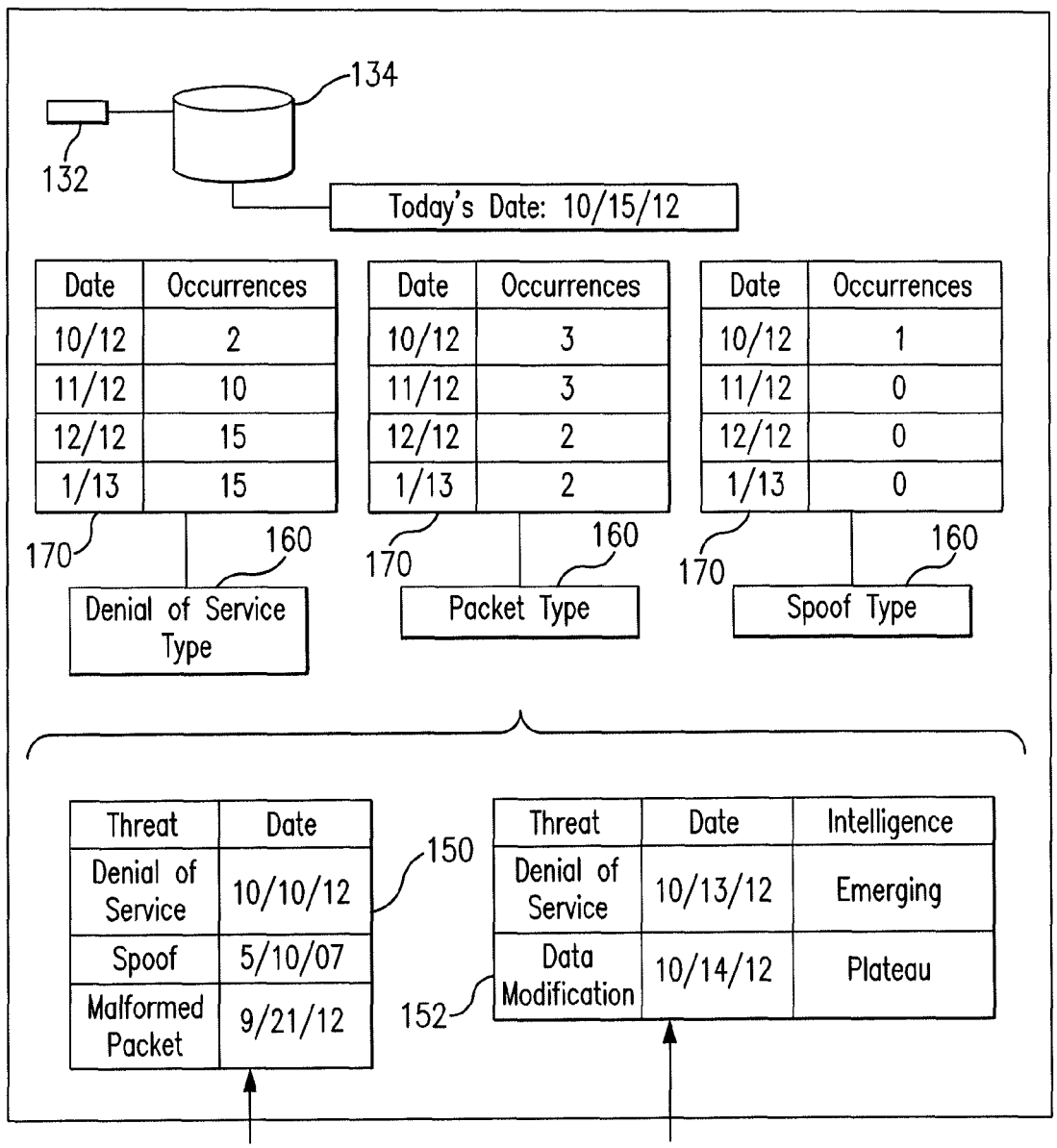
FIG. 2 illustrates a server of the system of FIG. 1 for enhancing network security.
Figure 3:
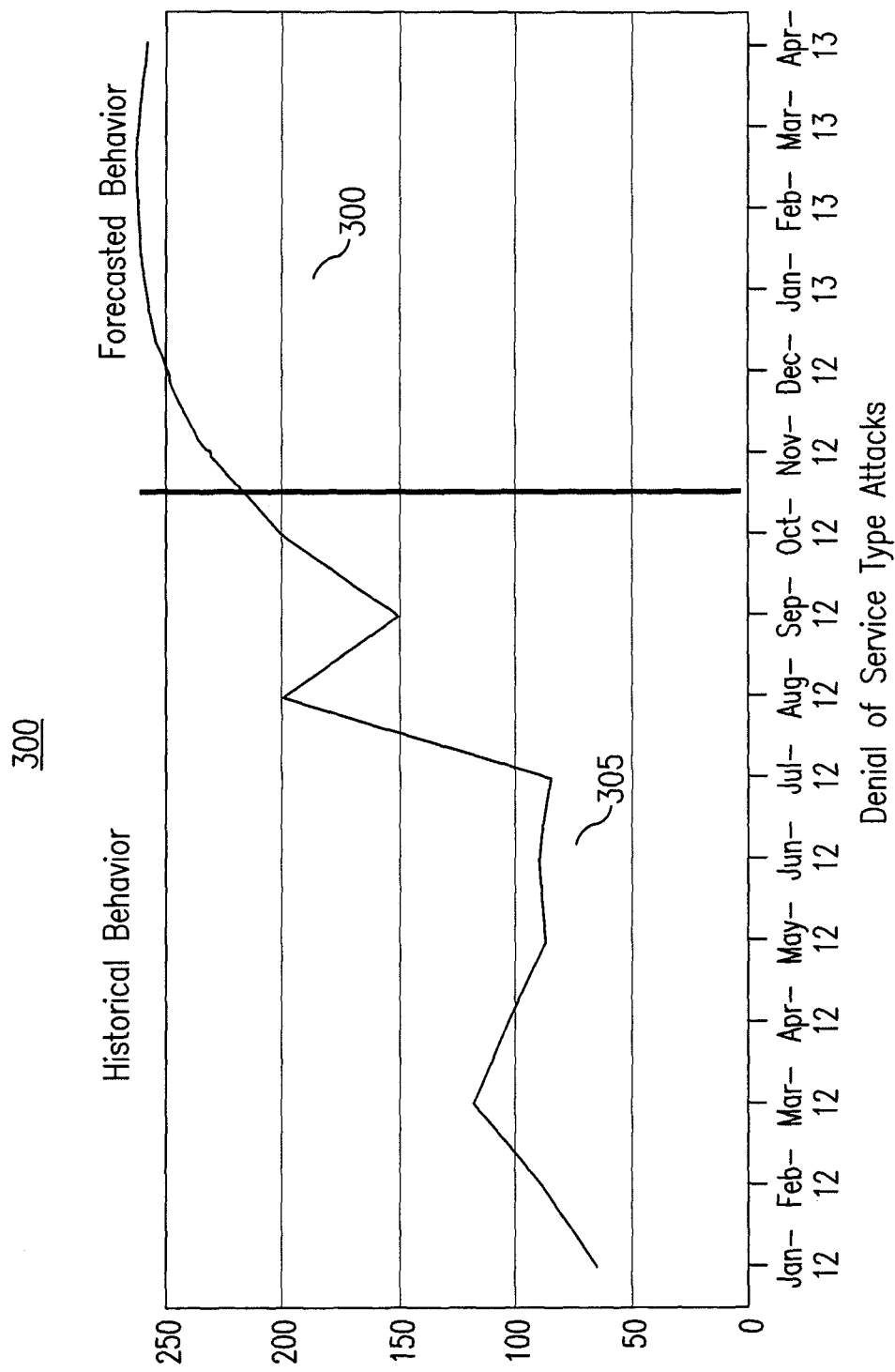
FIG. 3 illustrates a chart analyzing a security threat type by a server of the system of FIG. 1.

FIGS. 2 and 3 further illustrate the operation of system 100. FIG. 2 provides more detail as to the operation of server 110. FIG. 3 illustrates the results of the operation of server 110.

FIG. 2 illustrates a server 110 of the system 100 of FIG. 1 for enhancing network security. As provided by FIG. 2, server 110 may analyze received threat data 150 and intelligence data 152 to generate security threat categories 160 and forecasts 170. In this manner, server 110 may appropriately categorize security threats and predict the impact that the security threat may have on network 120.

Server 110 may store the current date. Server 110 may use the current date in generating forecasts 170. For example, server 110 may use the current date to determine how long ago a particular attack occurred. As another example, server 110 may use the current date to determine the dates of predicted occurrences in forecasts 170.

Server 110 may receive threat data 150 from threat database 140. Threat data 150 may include a record of occurrences of particular security threats. For example, threat data 150 may include the security threat and a date associated with an occurrence of the security threat. In the example of FIG. 2, threat data 150 indicates that a denial of service attack occurred on Oct. 10, 2012, a spoof attack occurred on May 10, 2007, and a malformed packet attack occurred on Sep. 21, 2012. This disclosure contemplates threat data 150 including any number of entries for any number of security threats.

Server 110 may receive intelligence data 152 from intelligence database 142. Intelligence data 152 may indicate trends and critical dates associated with particular security threats. In the example of FIG. 2, intelligence data 152 indicates a critical date of Oct. 13, 2012 associated with denial of service attacks and a critical date of Oct. 14, 2012 associated with data modification attacks. The critical dates may indicate when the security threats have become emerging threats or when the security threats have began to decline. This disclosure contemplates intelligence data 152 including any suitable intelligence and analysis associated with security threats. In the example of FIG. 2, intelligence data 152 indicates that denial of service attacks were designated as an emerging threat on Oct. 13, 2012 and that data modification attacks were designated as plateauing on Oct. 14, 2012.

Server 110 may examine threat data 150 and intelligence data 152 to categorize security threats into security threat categories 160. In the example of FIG. 2, server 110 has generated three security threat categories 160. A denial of service type, a packet type, and a spoof type. Each category may be associated with particular security threats. For example, the denial of service type may be associated with denial of service attacks. The packet type may be associated with packet type attacks such as malformed packet attacks and data modification attacks. The spoof type may be associated with spoof type attacks such as spoof attacks. Server 110 may categorize the security threats based on rules stored in server 110. For example, the rules may indicate that denial of service attacks may be included in the denial of service type category. Furthermore, the rules may indicate that malformed packet attacks and data modification attacks may be included in the packet type category. Based on these rules, server 110 may categorize the various security threats.

Server 110 may analyze threat data 150 and intelligence data 152 to generate forecasts 170 that predict the behavior of particular security threat categories 160. The forecasts 170 may include the dates and number of predicted occurrences associated with those dates. In the example of FIG. 2, the forecast 170 associated with denial of service type attacks indicates that two occurrences are predicted in October 2012, ten occurrences are predicted in November 2012, and fifteen occurrences are predicted in December 2012 and January 2013. Server 110 may have reached this prediction because threat data 150 indicates that a denial of service attack occurred on Oct. 10, 2012 and intelligence data 152 indicates that denial of service attacks were designated as an emerging threat on Oct. 13, 2012, thus indicating that more denial of service attacks should be expected following the Oct. 10, 2012 incident. Hence, server 110 predicts an increasing number of occurrences of denial of service attacks in the months following October 2012.

As another example, the forecast 170 associated with packet type attacks indicates that three packet type attacks are expected in October 2012 and November 2012, and that two packet type attacks are expected in December 2012 and January 2013. Server 110 may have determined this forecast 170 because threat data 150 indicates that a malformed packet attack occurred on Sep. 21, 2012 (one month ago) and intelligence data 152 indicates that data modification attacks were designated as plateauing on Oct. 14, 2012. Based on this information, server 110 may conclude that packet type attacks are expected to remain steady.

As yet another example, the forecast 170 associated with spoof type attacks indicates that spoof type attacks are on the decline and/or dying out. Server 110 predicts one occurrence in October 2012 and no further occurrences in November 2012, December 2012, and January 2013. Server 110 may have reached this forecast 170 because threat data 150 records only one spoof attack occurring over five years ago in May of 2007. Based on this information, server 110 may conclude that spoof type attacks have declined and/or have died out.

A user 112 may use forecasts 170 to enhance network security. In the example of FIG. 2, the forecast 170 associated with the denial of service type attacks indicates an increasing number of denial of service type attacks in the future. Based on this information, user 112 may determine that appropriate protections against denial of service type attacks should be implemented on network 120. As another example, the forecast 170 associated with spoof type attacks indicates that spoof type attacks are on the decline and/or have died out. Based on this information, user 112 may determine that protections against spoof type attacks may be safely removed from network 120. In this manner, server 110 may help implement the appropriate protections for a network 120, thus enhancing the overall security of the network 120.

FIG. 3 illustrates a chart 300 analyzing a security threat type by a server 110 of the system 100 of FIG. 1. Chart 300 may be presented on a display of device 114. User 112 may view the chart 300 to make decisions regarding network 120.

Chart 300 illustrates the historical behavior 305 of a particular security threat category 160. In the example of FIG. 3, chart 300 illustrates the historical behavior 305 of denial of service type attacks. The historical behavior 305 indicates that denial of service type attacks have been steadily increasing across the calendar year 2012. Server 110 may have determined the historical behavior 305 based on threat data 150 received from threat database 140.

Chart 300 may further provide forecasted behavior 310 that indicates the predicted future occurrences of a particular security threat category 160. In the example of FIG. 3, chart 300 illustrates the forecasted behavior 310 of denial of service type attacks. The forecasted behavior 310 indicates that denial of service type attacks are expected to increase steadily in the future. The forecasted behavior 310 may be based upon forecasts 170 generated by server 110. Server 110 may have generated the forecast 170 based on the historical behavior 305 and intelligence data 152 received from intelligence database 142.

A user 112 may use chart 300 to determine the appropriate steps to take in response to a particular security threat category 160. In the example of FIG. 3, a user 112 may use chart 300 to determine that appropriate protections against denial of service type attacks should be implemented because the number of denial of service type attacks is expected to increase steadily in the future. By implementing protections now, user 112 may protect against a security threat category 160 that is expected to occur even more in the future.

Figure 4:
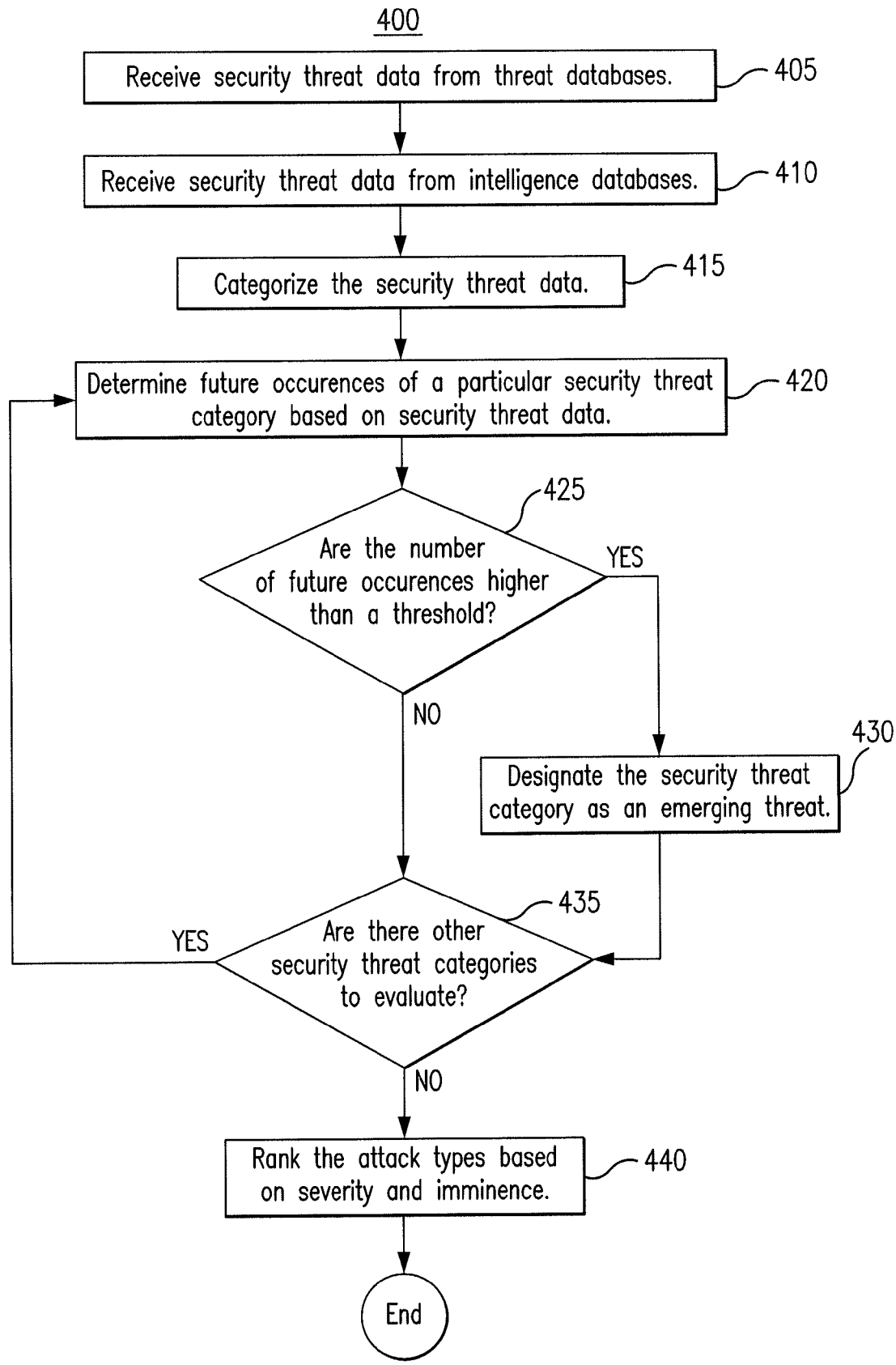
FIG. 4 is a flowchart illustrating a method of enhancing network security.

FIG. 4 is a flowchart illustrating a method 400 of enhancing network security. Server 110 may perform method 400. By performing method 400, server 110 may help enhance network security by informing users which security threat categories should be protected against.

Server 110 may begin by receiving security threat data from threat databases in step 405. The threat databases may include information associated with past occurrences of particular security threats. For example, the threat databases may include the dates of occurrences of denial of service attacks, spoof attacks, data modification attacks, and/or any other suitable type of security threat. Server 110 may use this historical data in predicting future behavior associated with the security threats.

In step 410, server 110 may receive security threat data from intelligence databases. The intelligence databases may include intelligence and analysis associated with particular security threats. For example, the intelligence databases may include critical dates associated with particular security threats such as the date when denial of service attacks were designated as an emerging threat and a date when spoof attacks began declining and/or dying out. Server 110 may use information from the intelligence databases in forecasting the future behavior of particular security threats.

Server 110 may categorize the security threat data into attack types in step 415. In particular embodiments, server 110 may categorize the security threat data based on rules stored in server 110. Each security threat category may represent one or more security threats that may affect the network. For example, a particular security threat category may represent security threats that are preventable by a firewall. As another example, a security threat category may represent security threats that involve packet manipulation. Server 110 may forecast the behavior of the security threat categories.

In step 420, server 110 may determine future occurrences of a particular security threat category based on security threat data. In particular embodiments, server 110 may perform a statistical analysis to predict the future occurrences of the particular security threat category. For example, server 110 may analyze the dates of historical occurrences of the particular security threat category to determine any trends in the occurrences. For example, server 110 may determine that the particular security threat category has been increasing in number. Based on that increase, server 110 may predict that more occurrences of the particular security threat category may occur in the future. As another example, server 110 may determine from the security threat data that the historical occurrences of a particular security threat category have been decreasing. Based on this information, server 110 may determine that the number of future occurrences of the security threat category may further decline and/or cease. Server 110 may make further determinations based on these predictive future occurrences.

Server 110 may determine whether the security threat category is an emerging threat. Server 110 may alert users about emerging threats so that the users may implement appropriate protections before attacks occur. In step 425, server 110 may determine whether the predicted number of future occurrences is higher than a threshold. The threshold may be stored in the server 110 and/or defined by a user. If the predicted number of future occurrences is higher than the threshold, server 110 may designate the security threat category as an emerging threat in step 430. In particular embodiments, server 110 may further notify users that the security threat category is an emerging threat. Users may then implement appropriate protections to protect against the emerging threat before attacks happen. Server 110 may further record the date and/or time when the security threat category was designated as an emerging threat. This information may be recorded in an intelligence database.

If the predicted number of future occurrences is not higher than the threshold, server 110 may continue to step 435 to determine whether there are other security threat categories to evaluate. If there are, server 110 may return to step 420 to determine the future occurrences of the security threat categories. If there are no further security threat categories to evaluate, server 110 may rank the security threat categories based on severity and imminence in step 440. For example, a security threat category that is an emerging threat may be ranked higher than an security threat category that is on the decline. Server 110 may notify users of the ranking to provide guidance as to which security threat categories should be protected against first. Users may use these rankings to prioritize the protections to be implemented on their networks.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
receiving a plurality of security threats;
categorizing, by a processor, each security threat in the plurality of security threats into a security threat category of a plurality of security threat categories;
determining, by the processor, based at least in part upon a first past occurrence of a first security threat category of the plurality of security threat categories and disregarding a second past occurrence of the first security threat category, that a number of occurrences of the first security threat category has increased;
in response to the determination that the number of occurrences of the first security threat category has increased, determining, by the processor, based at least in part upon an instance of a second security threat category of the plurality of security threat categories and based at least in part upon a date associated with a past occurrence of the first security threat category, that the number of occurrences of the first security threat category will continue to increase;
in response to the determination that the number of occurrences of the first security threat category will continue to increase, determining, by the processor, based at least in part upon a threshold, that the first security threat category is an emerging threat, wherein the threshold is based at least in part upon the first past occurrence of the first security threat category;
determining, by the processor, a management priority for the first security threat category;
determining, by the processor, based at least in part upon a past occurrence of the second security threat category, that a number of occurrences of the second security threat category has plateaued;
in response to the determination that the number of occurrences of the second security threat category has plateaued, determining, by the processor, that the number of occurrences of the second security threat category will decrease; and
determining, by the processor, based at least in part upon a past occurrence of a third security threat category of the plurality of security threat categories, that an instance of a fourth security threat category will occur.

2. The method of claim 1, further comprising communicating a message indicating that the first security threat category is an emerging threat.

3. One or more computer-readable non-transitory storage media embodying software that is operable when executed to:
receive a plurality of security threats;
categorize each security threat in the plurality of security threats into a security threat category of a plurality of security threat categories;
determine, based at least in part upon a first past occurrence of a first security threat category of the plurality of security threat categories and disregarding a second past occurrence of the first security threat category, that a number of occurrences of the first security threat category has increased;
in response to the determination that the number of occurrences of the first security threat category has increased, determine, based at least in part upon an instance of a second security threat category of the plurality of security threat categories and based at least in part upon a date associated with a past occurrence of the first security threat category, that the number of occurrences of the first security threat category will continue to increase;
in response to the determination that the number of occurrences of the first security threat category will continue to increase, determine, based at least in part upon a threshold, that the first security threat category is an emerging threat, wherein the threshold is based at least in part upon the first past occurrence of the first security threat category;
determine a management priority for the first security threat category;
determine, based at least in part upon a past occurrence of the second security threat category, that a number of occurrences of the second security threat category has plateaued;
in response to the determination that the number of occurrences of the second security threat category has plateaued, determine that the number of occurrences of the second security threat category will decrease; and
determine, based at least in part upon a past occurrence of a third security threat category of the plurality of security threat categories, that an instance of a fourth security threat category will occur.

4. The media of claim 3 embodying software that is further operable when executed to communicate a message indicating that the first security threat category is an emerging threat.

5. A system comprising:
a memory; and
a processor communicatively coupled to the memory and configured to:
receive a plurality of security threats;
categorize each security threat in the plurality of security threats into a security threat category of a plurality of security threat categories;
determine, based at least in part upon a first past occurrence of a first security threat category of the plurality of security threat categories and disregarding a second past occurrence of the first security threat category, that a number of occurrences of the first security threat category has increased;
in response to the determination that the number of occurrences of the first security threat category has increased, determine, based at least in part upon an instance of a second security threat category of the plurality of security threat categories and based at least in part upon a date associated with a past occurrence of the first security threat category, that the number of occurrences of the first security threat category will continue to increase;
in response to the determination that the number of occurrences of the first security threat category will continue to increase, determine, based at least in part upon a threshold, that the first security threat category is an emerging threat, wherein the threshold is based at least in part upon the first past occurrence of the first security threat category;

determine a management priority for the first security threat category;

determine, based at least in part upon a past occurrence of the second security threat category, that a number of occurrences of the second security threat category has plateaued;

in response to the determination that the number of occurrences of the second security threat category has plateaued, determine that the number of occurrences of the second security threat category will decrease; and determine, based at least in part upon a past occurrence of a third security threat category of the plurality of security threat categories, that an instance of a fourth security threat category will occur.

6. The system of claim 5 wherein the processor is further configured to communicate a message indicating that the first security threat category is an emerging threat.

* * * * *